Sept. 10, 1957     E. J. LATTNER ET AL     2,805,796
FERTILIZER SPREADER
Filed April 8, 1954     4 Sheets-Sheet 1
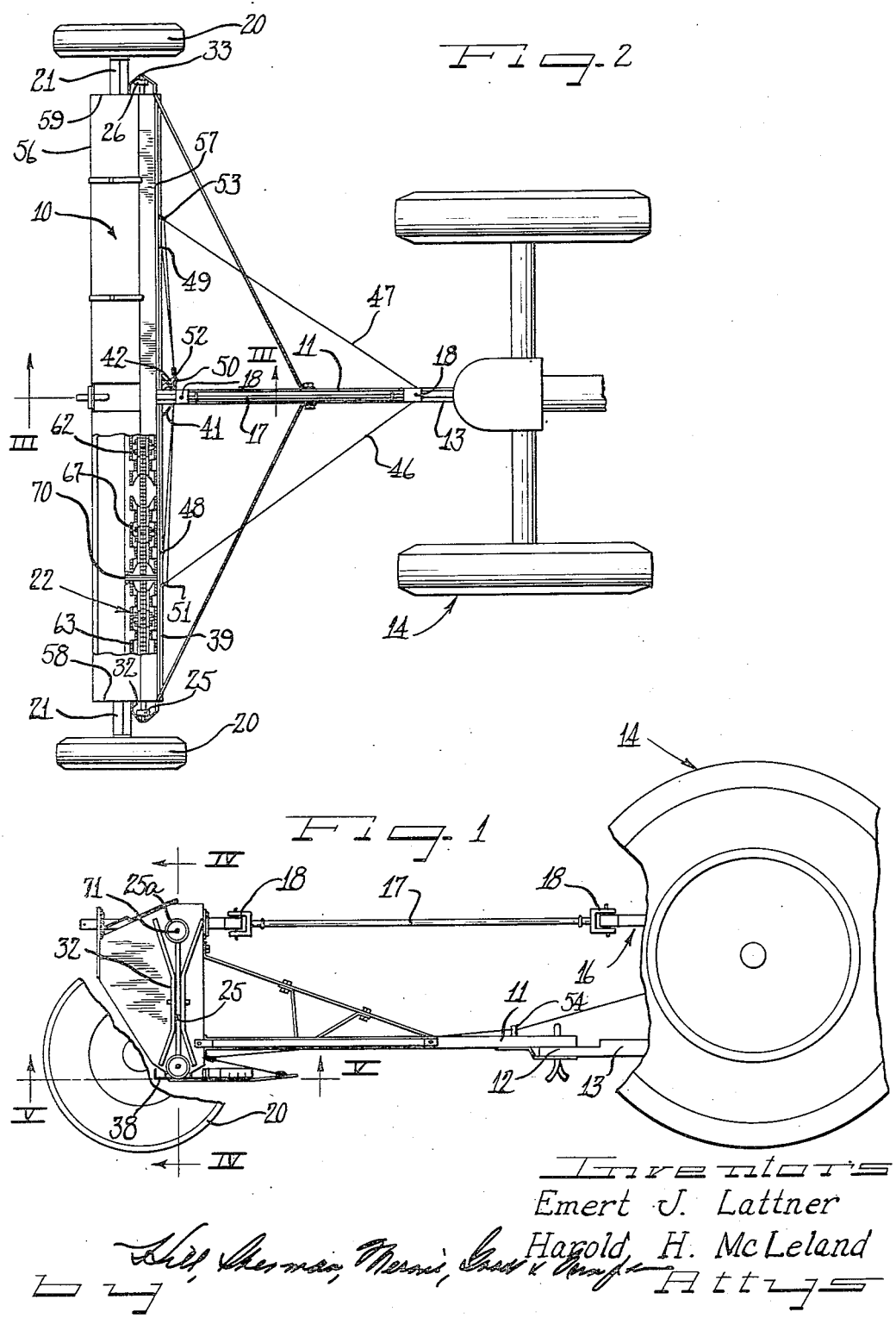
Inventors
Emert J. Lattner
Harold H. McLeland
Attys

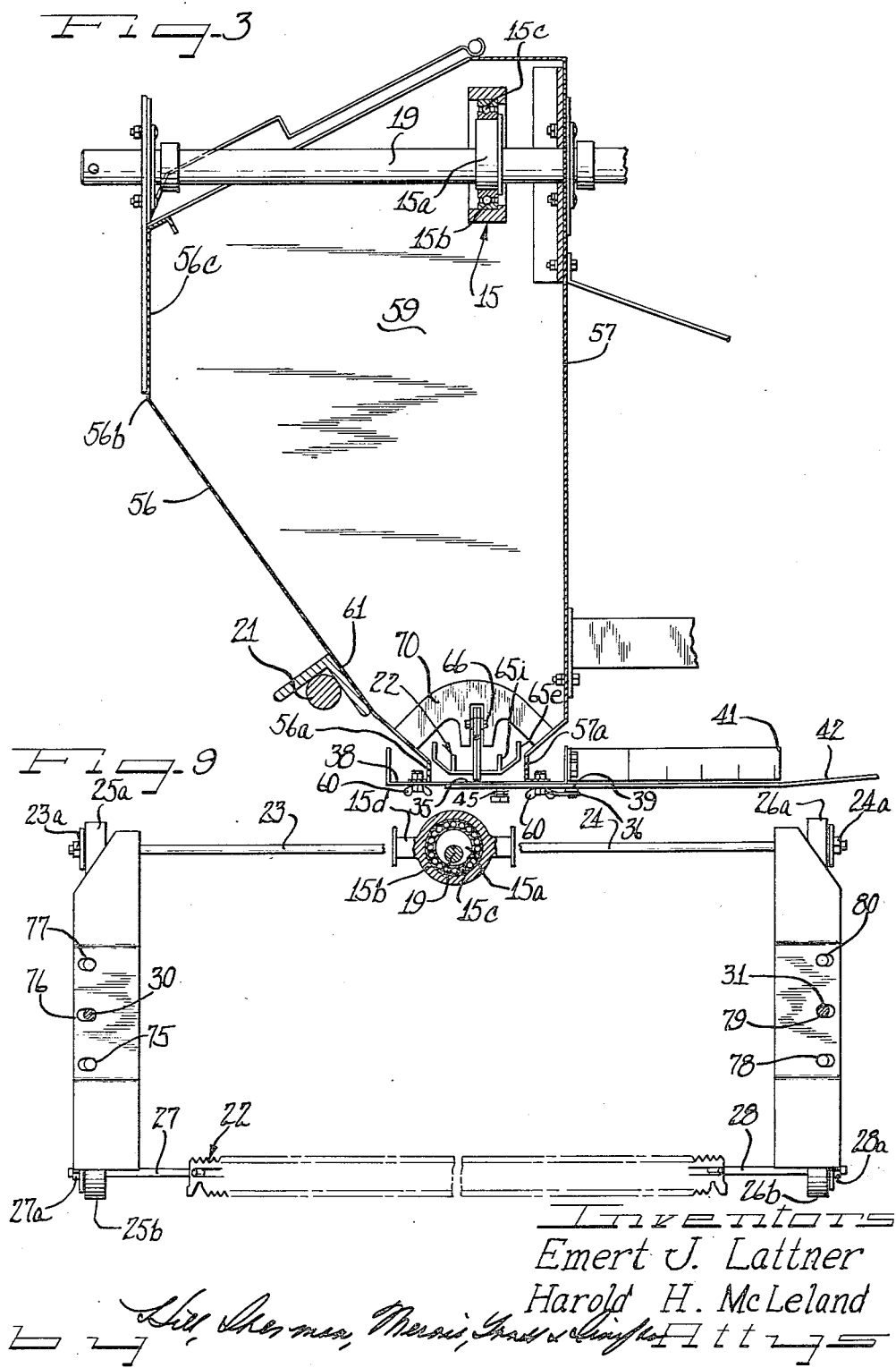

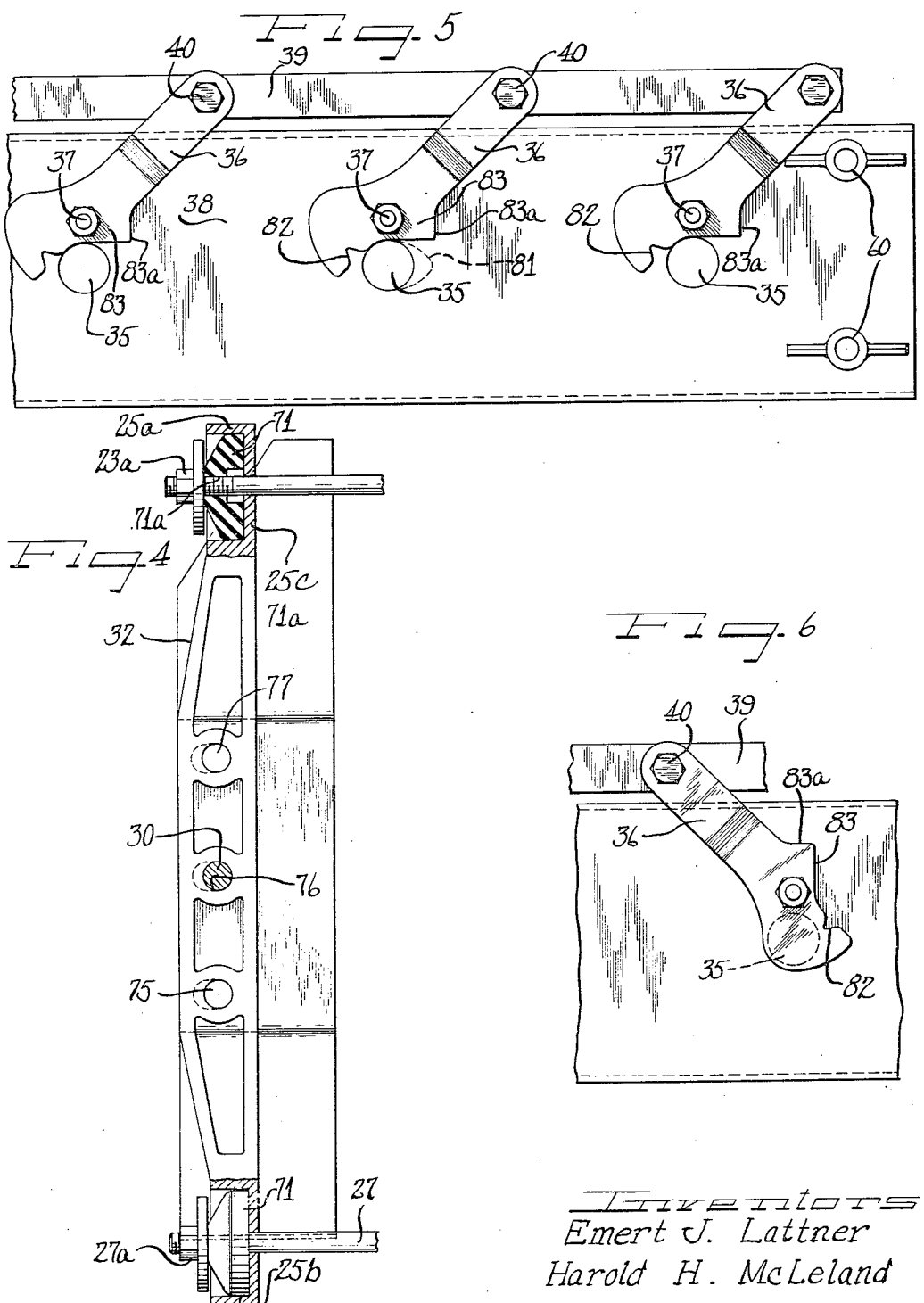

Sept. 10, 1957 E. J. LATTNER ET AL 2,805,796
FERTILIZER SPREADER
Filed April 8, 1954 4 Sheets-Sheet 4
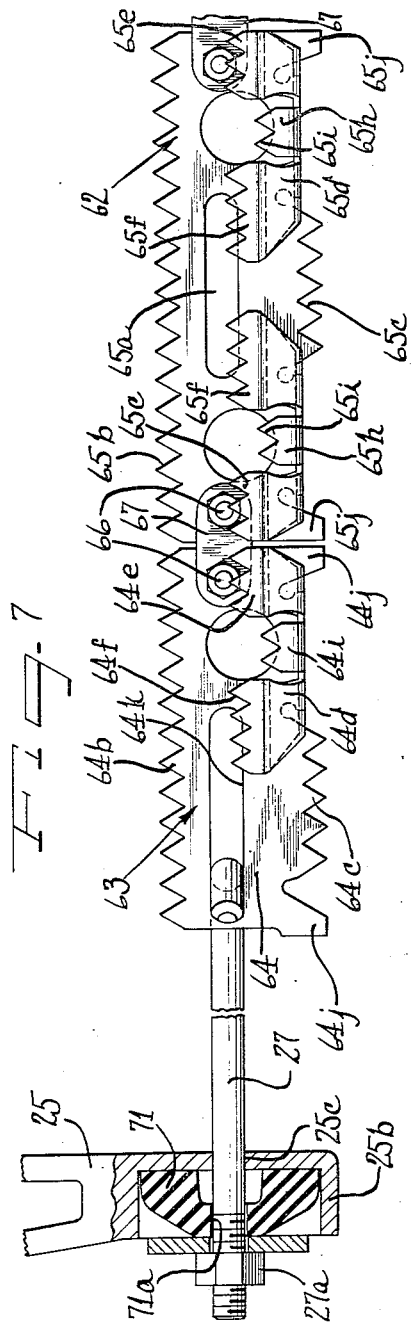
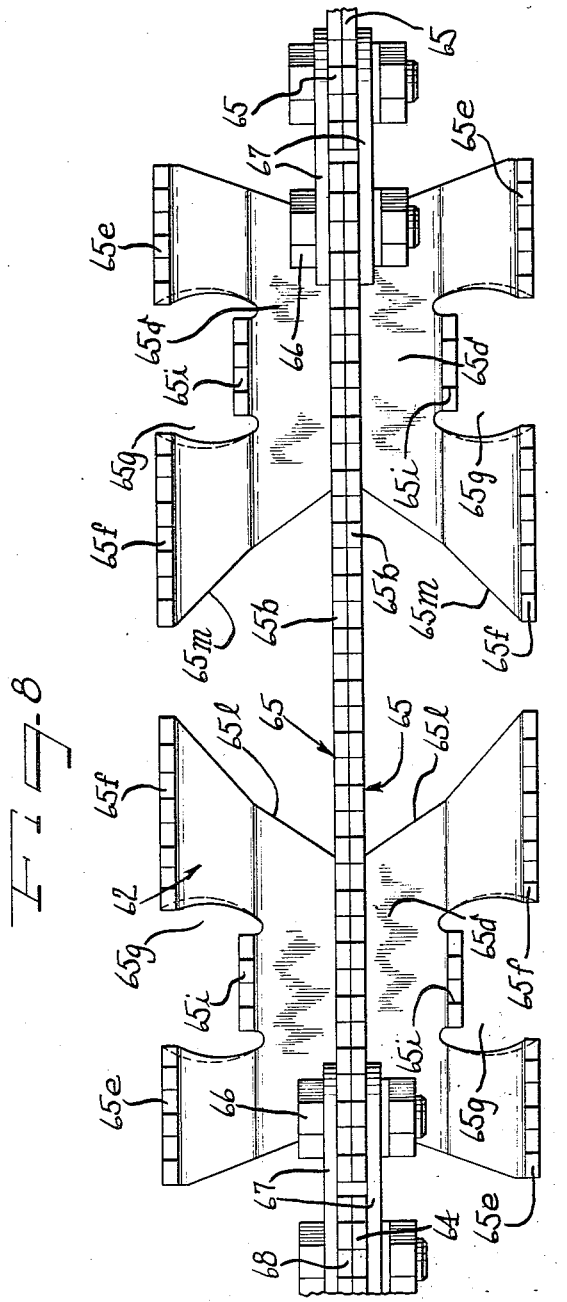
Inventors
Emert J. Lattner
Harold H. McLeland
Attys

2,805,796

FERTILIZER SPREADER

Emert J. Lattner and Harold H. McLeland,
Cedar Rapids, Iowa

Application April 8, 1954, Serial No. 421,826

16 Claims. (Cl. 222—244)

The present invention relates to apparatus for evenly distributing fertilizers and/or similar materials over the ground. More particularly, the present invention relates to a novel apparatus for finely dividing caked material, delivering such material to distribution orifices for gravity distribution therethrough and passing the finely divided material through adjusted metering orifices for dispersion onto the surface below the apparatus.

For many years, the need for fertilizers has been well known. As the nation's supply of unused, tillable land has decreased to practically nil, the demand for increased productivity of the land in use has increased. The major step in the improvement of land has, of course, been through the addition of chemical nutrients to the soil. While such chemicals may of course be distributed by hand, ordinarily they are so heavy and such quantities are used that machinery is considered necessary for satisfactory distribution.

We are, of course, aware of the fact that numerous fertilizer spreading machines have been developed, patented and used in the prior art. Such machines have been in use since the early stages of fertilizer distribution in the nineteenth century. However, to our knowledge none of the mechanisms heretofore known have completely solved all of the serious problems presented in the efficient distribution of commercially known and manufactured fertilizers.

For example, some types of fertilizer have a tendency to become caked into large, extremely hard lumps when stored any length of time. Other chemical fertilizers have a tendency to cake and adhere to mechanical parts moving under friction load and in the presence of heat, thereby tending to disrupt operation of the spreading mechanism. Other fertilizers are produced in the form of pellets that require distribution with an absolute minimum of breakage. Still other fertilizers, such as fertilizers in an incompletely cured condition, tend to pack during the spreading operation and in many cases will completely clog and stall the mechanical distributing apparatus of spreaders heretofore known.

By means of the distribution apparatus of the present invention, fertilizers of the types above set forth are readily distributable without danger of stalling the apparatus, no matter how hard the chunks of fertilizer are, their size, or their packing tendencies, or even their pelletized condition.

Aside from the excellent distribution characteristics of the fertilizer spreader herein disclosed, the apparatus of the present invention is extremely proficient in the distribution of very small, already finely divided, particles such as for example grass seed or other seeds. Such seeds should, of course, be distributed without injury by the distributing apparatus and in view of this requirement, it has been found that the ordinary apparatus heretofore marketed for use as fertilizer spreaders are very inefficient as seeders and vice versa. However, the present apparatus is not only fully capable of completely pulverizing and otherwise reducing to a fine condition any of the commercial fertilizers now marketed, but is also able to satisfactorily sow seed materials without any injury whatever to them. Further, the apparatus of the present invention also overcomes the above noted, heretofore serious, problem of spreading pellet type fertilizers. It is desired that such fertilizers be distributed without damage to the pellet structure and therefore, conventional fertilizer spreaders capable of spreading fertilizers other than pellets have been found very inefficient in the handling of the pellet type. The apparatus of the present invention, however, is fully capable of spreading pellet type fertilizers with substantially negligible breakage.

In accomplishing the aforesaid purposes, the present invention provides a distributor having a plurality of side by side simultaneously adjustable apertures over which a reciprocating agitator moves. The agitator is provided with a series of upstanding fertilizer engaging saw teeth and is also provided with a plurality of downwardly extending saw teeth placed substantially over the apertures. The hopper within which the agitator moves is shaped to prevent bridging, and fertilizer controlling baffles are utilized to prevent reciprocation of the fertilizer with the reciprocating agitator. The stroke of the agitator is variable and the saw teeth on the agitator are spaced to permit the distribution of seeds or pellets without breakage when a short stroke and a small aperture opening is utilized. On the other hand, when large chunks are to be broken, the stroke of the agitator may be increased slightly and extremely efficient comminuting action takes place in breaking down caked fertilizer.

It is therefore an object of the present invention to provide an extremely versatile distributing apparatus capable of selectively comminuting material to be spread or distributing materials with which breakage cannot be tolerated.

Another object of the present invention is to provide a fertilizer spreader capable of simultaneously reducing caked or otherwise lumpy fertilizer materials into a readily distributable mass and metering said mass evenly unto the ground.

Another object of the present invention is to provide a novel agitator system for fertilizer spreaders capable of reducing extremely large and hard fertilizer substances into a readily distributable size.

A further object of the present invention is to provide a novel agitator drive system for tractor driven fertilizer and seed distributors.

Yet another object of the present invention is to provide a novel and extremely efficient reciprocating fertilizer comminuter for fertilizers of the hard, caking type.

Yet a further object of the present invention is to provide a novel reciprocating saw combined with a fertilizer hopper construction for maintaining fertilizer in a non-reciprocating condition immediately above and adjacent the reciprocating saw.

Still a further object of the present invention is to provide a novel adjustable orifice for distributing fine materials.

A feature of the present invention is the provision of a novel orifice size adjustment wherein the orifice cover plate is provided with a notch and the orifice itself is circular.

A further feature of the present invention is a parallelogram reciprocating agitator drive wherein motion is transmitted from one link of the parallelogram to an opposite agitator link through intermediate links having a plurality of adjustments, whereby length of stroke of the opposite link is variable.

Still another feature of the present invention is the provision of a parallelogram driving linkage for a reciprocating fertilizer agitator wherein the agitator is constantly retained in tension in a resilient manner.

Another feature of the present invention is an agitator comprising a saw segment having upwardly as well as downwardly extending saw teeth laterally spaced sufficiently to permit operation of the saw as a comminuting device or as a mere distribution apparatus.

Still a further object of the present invention is to provide a novel fertilizer spreading apparatus wherein metal to metal contact within the body of fertilizer being distributed is reduced to a substantial minimum.

Still another object of the present invention is to provide a reciprocating fertilizer comminuting and distributing apparatus wherein a saw combines to operate as a comminuting apparatus and simultaneously provides means for continuously cleaning the distributor.

Yet another object of the present invention is to provide a reciprocating saw type comminuter having resilient drive whereby shocks incident to comminution are dampened without injury to the drive system.

Still other and further objects and features of the present invention will at once become apparent to those skilled in the art from a consideration of the attached sheets of drawings in which:

Figure 1 is an elevational view of the fertilizer distributing apparatus constructed according to the present invention connected to a conventional tractor, partially illustrated;

Figure 2 is a plan view of the fertilizer distributing apparatus of the present invention connected to a conventional tractor, partially disclosed;

Figure 3 is a cross sectional view in elevation taken along the line III—III of Figure 2;

Figure 4 is a view in partial cross section taken along the line IV—IV of Figure 1;

Figure 5 is a bottom view of the distributing apparatus of the present invention taken along the line V—V of Figure 1;

Figure 6 is a view similar to Figure 5 with the distributing apparatus in a different position of operation;

Figure 7 is a side elevational view of a section of the reciprocating comminuting and distributing agitator of the present invention;

Figure 8 is a plan view of the combined saw and distributing apparatus constructed according to the principles of the present invention; and Figure 9 is a vertical elevational view of the agitator drive system per se.

As shown on the drawings:

As may be seen from a consideration of Figures 1 and 2, the combined fertilizer spreader and seeder of the present invention comprises a transversely extending hopper 10 having a rigid attachment tongue 11 secured thereto for pivotal connection at 12 to the implement hitch 13 of a conventional tractor 14. An eccentric transmission drive 15 for actuating the spreader, is positioned intermediate the ends of the hopper 10 and is driven from the power take-off 16 by means of a rotating propeller shaft 17 universally connected to the mechanism 15 and the power take-off shaft 16 by means of universal joints 18. The wheels 20 are freely and rotatably mounted on fixed spindles 21 secured to the hopper 10 and non-drivingly associated therewith. Thus, the wheels 20 rotate freely without any driving effect on the distributing apparatus disclosed herein.

As may be seen from Figures 2, 3 and 9, the hopper 10 contains a reciprocating agitator or saw 22. This agitator is reciprocated along adjacent the bottom of hopper 10 on an axis parallel to the axis of the hopper by means of the eccentric mechanism 15 which transmits a reciprocating force through connecting rods 23 and 24, the rocker arms 25 and 26 and J-bolts 27 and 28 to the agitator 22. The rocker arms 25 and 26 are respectively pivoted about the pivot pins 30 and 31 supported by channels 32 and 33. As may be seen from a consideration of Figures 4 and 9, the channel members 32 and 33 have a plurality of apertures therein extending in a vertical row for purposes that will be more fully described below.

Positioned immediately below the saw 22, are a series of distributing orifices or apertures 35. These apertures are positioned for partial or complete enclosure by means of the orifice adjuster levers 36 pivotally mounted about pins 37 that are in turn rigidly secured on the bottom plate 38. The levers 36 are simultaneously actuated by means of a reciprocating bar 39 pivotally secured to each of the levers 36 by means of connecting pins 40. The orifice adjustment levers 36 are, as will be discussed more fully below, adjustable through an angle of 90° and indicia are provided on the quadant 41 secured to the bottom plate 38 as an aid in visually adjusting the position of the bar 39 by means of lever 42. The lever 42 is frictionally maintained in adjusted position through the resistance of the individual levers 36 to movement. This resistance is provided by springs 45 surrounding the fastening bolts 37 that secure the levers 36 to the bottom plate 38.

While numerous conventional arrangements may be utilized for permitting operation of the orifice control lever 42 from the cockpit of the tractor, it has been found that a very satisfactory installation may comprise a pair of ropes 46 and 47 secured at 48 and 49 to the bottom plate of the hopper 10. By passing the ropes through the pulleys 50, 51 and 52, 53 before stringing them through the guide loops 54, a mechanical advantage is achieved that permits the easy adjustment of the rod 39 even though the spring tension provided by the springs 45 is extremely high.

Having thus described the overall arrangement of our invention, certain portions of the apparatus will now be described in more detail.

*Hopper construction.*—The hopper generally as indicated at 10 comprises a pair of sheet metal side walls 56 and 57 securely welded to end walls 58 and 59. The sheet metal used in these walls is relatively heavy, preferably being at least 14 gauge sheet steel. The bottoms of the walls 56 and 57 are formed into U-channels at 56a and 57a respectively and the wall 56 is further rigidified by provision of a bend 56b at its upper end. The hopper bottom 38 comprises a channel member of relatively heavy sheet metal, preferably 12 gauge rigidly secured to the channels 56a and 57a by means of wing nuts 60. Further rigidification of the hopper 10 is provided by the transversed guide members 70. These guides prevent the agitator 22 from shifting sideways during operation, prevent reciprocations of the fertilizer with the agitator and also provide rigidification of the hopper 10 along the bottom thereof. The axle 21 is a solid channel member having spindles at the opposite ends thereof and is secured at 61 to the hopper side wall 56 at several places along its length.

From the above, it will be apparent that the hopper shape herein provided is extremely rigid and, therefore, no further supporting angles or other structural members are required. It has been found in actual tests that the channels 56a, 56b, and the channel shape of the hopper bottom 38 provide sufficient rigidity to stand up under strenuous use. This is true even though, as will be described below, the eccentric drive mechanism 15 is solely supported by the sheet metal side walls 56 and 57.

As may clearly be seen from a consideration of Figure 3, the front wall 57 has been illustrated as a substantially vertical side wall, while the rear wall 56 has a definite slope. Most conventional fertilizer spreaders utilize a hopper having a sloping front as well as a sloping rear wall in order to increase the hopper capacity. However, by providing a vertically upstanding front hopper wall, all problems relative to bridging of the fertilizer material have been eliminated. With fertilizers having packing tendencies, it has been found that a keystone type bridge will very often form where both sides of the hopper are angularly sloped. When such a bridge forms, the effectiveness of the distributing apparatus is substantially eliminated since the bridge will prevent any fertilizer material from engaging with the comminuting apparatus 22. This problem has been entirely overcome in the present construction, without any substantial loss in hopper capacity by providing a vertically upstanding rear wall portion 56c and thus increasing somewhat the height of the fertilizer hopper. Experience in the field has proven that bridging is eliminated through the use of vertical or an undercut wall and as a result, the fertilizer spreader of the present invention has proven extremely efficient. It is to be noted, of course, that the vertical wall may be either the front or the back wall of the apparatus, the only requirement being that one of the walls is substantially vertical or undercut to prevent any bridging tendencies.

*Agitator.*—The agitator or saw used in the present invention may be seen from a consideration of Figures 7 and 8. The agitator comprises a series of segments or links comprised of two types. These are the end segments 63, and the center segments 62. As may be seen from the figures, the end segments are similar to the center segments but are modified somewhat to accommodate the agitator drive apparatus.

Each of the central segments or links generally indicated at 62 comprises a pair of similar, symmetrical, saw blade sections 65 secured together by means of bolts 66. The bolts 66 also secure links 67 to the segments 62 to connect adjacent segments of the agitator together.

Each of the saw sections 65 comprises a central saw portion 65a having upstanding vertically projecting saw teeth 65b along its upper surface and downwardly projecting saw teeth 65c at the central portion of its lower edge. Integral with the central section 65a, a pair of side wings 65d are bent outwardly and upwardly to provide upstanding saw tooth surfaces 65e and 65f. The saw surfaces 65e and 65f are in line with each other and parallel to the central section 65a and are separated from each other to provide a gap 65g. A shortened, upstanding projection 65h is bent up from the side wing 65d in the gap 65g between the saw surfaces 65e and 65f. The projection 65h carries vertically projecting teeth 65i. At the ends of each section 65, an integral downwardly projecting foot 65j is provided. The feet 65j project downwardly to substantially the same extent as the downwardly projecting intermediate teeth 65c.

The end segments 63 of the agitator 22 comprise a pair of saw members 64 and 68. These members are mirror images and hence are not symmetrical but the details of section 68 are generally the same as 64 shown in Figure 7. The saw member 64 is provided with end supporting feet 64j and, as in the case of the center segments, is provided with upstanding saw teeth 64b, downwardly extending saw teeth 64c, and wings 64d carrying upwardly extending series of teeth 64e and 64f as well as the intermediate upwardly extending teeth 64i. However, as may be seen from Figure 7, one of the wings 64d has been eliminated in order to permit the passage of a J bolt 27 into the slot 64k without interference from wing teeth.

In operation, the end segments perform substantially identically to the center segments, the operation of which will now be described. The saw segments 62 and 63 reciprocate back and forth above the bottom 38 with the saw teeth 65c and 64c facing downwardly immediately over the orifices 35. The segments are maintained in their aligned, axially operating position by means of the transverse guides 70 secured to the walls 56 and 57. These guides are loosely fitted to the sections 65a and contact these walls only when there is a lateral deflection to a reasonable extent. The only points of contact between the segments and the hopper bottom, when the agitator is operating on the hopper bottom in a dry state, are the feet 64j, 65j and the downwardly facing teeth 64c and 65c. However, as soon as fertilizer or fertilizer material has been utilized in the apparatus, a slight build up of that material has been found to form on the feet 64j and 65j thereby preventing any metal to metal contact. Further, it has been found that when fertilizers of the super-phosphate type, which are very commonly used, are spread by the distributing apparatus of the present invention, the material actually has an affinity for moving metal parts operating in frictional contact and hence under heat. This affinity causes a coating of fertilizer to become substantially bonded to the bottoms of the feet 64j and 65j and provides a lubricating coating. By providing only small contact areas at the feet 64j and 65j, and by positioning the wings 64d, 65d substantially above the hopper bottom 38, build up of fertilizer underneath the saw or agitator wings 64d and 65d is prevented and hence problems of jamming due to caking of the fertilizer material to the underside of the saw segments are minimized.

The agitator structure shown has proven extremely effective. The upwardly directed saw teeth 65b are of a double width and comminute hard chunks of caked fertilizer in a manner somewhat similar to a large rip saw. Since the teeth 65b extend upwardly further than the teeth on the wings 65d, a slot will be cut in any large chunk of fertilizer before it contacts the upstanding teeth 65e and 65f. As the chunk progresses downwardly under the weight of the fertilizer positioned above it additional slots are cut in the chunk by the teeth 65e and 65f. As the chunk proceeds still further downwardly the teeth 65i intercept the bottom thereof and cut further slots. In this comminuting action the guides 70, lying transversely of the agitator 22, prevent the chunks of fertilizer immediately above the agitator from reciprocating with the agitator, thereby permitting a maximum saw action.

It has been found that by the time the fertilizer chunk has been contacted for several strokes by the teeth 65i, it will split upwardly along the line of the teeth 65b or the bottom portion of the chunk will have become so pulverized that the fertilizer chunk will continue downwardly around the sides of the wings 65d and between the slanting surfaces 65l and 65m. As the fertilizer moves downwardly between the slanting side walls 65l and 65m, it approaches the apertures 35 over which it is agitated by the downwardly extending teeth 65c and the reciprocating wedge action provided by the slanting surfaces 65l and 65m. Of course, the sharp teeth 64c provide a self-cleaning action to the orifice 35 and prevent the possible caking of fertilizer over the aperture.

As has been mentioned above, the saw or agitator of the present invention is an unusually efficient comminuting device for hard chunks of fertilizer and similar matter which must be finely divided prior to spreading. However, the agitator of the present invention is also particularly well suited to the distribution of fine seeds and other similar already finely divided matter which it is undesirable to further comminute or scarify. The teeth 65c and 65b are preferably manufactured with a tooth tip dimension of ⅜ inch when a minimum stroke of the agitator of ⅜ inch is provided. In the present invention, as will be described below, the agitator may be adjusted to travel a minimum stroke distance of between ¼ and ⅜ inch and when so adjusted the saw teeth act as conveyors solely. In such an adjustment, the teeth are sufficiently widely spaced that their strokes do not overlap and, instead, provide merely a gentle conveyor action which shakes the seeds over the apertures 35 to distribute them evenly over the ground.

In the planting of seeds of the type where scarification is desirable, the length of stroke is increased to the stroke ordinarily utilized for very hard fertilizers, namely the stroke of approximately 1⅜ inches. This stroke provides very rapid reciprocation over a relatively long distance which sufficiently jostles the seeds to abrade the surfaces thereof along with the conveyor action provided. Of course, no substantial comminuting action is needed in the case of seeds since they are already in a relatively finely divided state and seldom have a tendency to cake to the same extent experienced with fertilizer. Thus, the agitator teeth operate satisfactorily to spread seeds, or to comminute chunks of fertilizer material for ready spreading.

*Agitator drive mechanism.*—A schematic showing of the agitator drive system may be found in Figure 9. There, eccentric 15a is mounted for rotation with the drive shaft 19. An outer housing 15b is anti-frictionally mounted relative to the eccentric 15a for free rotational movement relative thereto by the ball bearings 15c. Longitudinally extending arms 15d threadedly connect to the respective reciprocating actuating rods 23 and 24. Thus rotation of the shaft 19 with the eccentric 15a will cause the housing 15b to reciprocate the rods 23 and 24 a distance equal to twice the eccentricity of the eccentric 15.

A relatively short eccentricity is preferably provided. In the first place, it is desired that the pivot pins 31 and 30 be positioned as far as possible away from the agitator 22 in order to prevent vertical lifting of the agitator at the extremities of the agitator stroke, and in the second place, it is desired in order to prevent excessive vibration which must necessarily occur from a large stroke of the eccentric due to the fact that the eccentric housing 15b will travel in a vertical direction as well as in the horizontal reciprocating direction during the stroke. By providing a relatively short stroke, this objectionable feature of vertical reciprocation with resultant vibration in the rods 23 and 24, is kept at a minimum. It is to be understood however, that the present invention contains within its scope modifications in stroke of the actuator 15, as well as variations in stroke length which will be further discussed below.

The rods 23 and 24 are resiliently connected, under tension only, to the rocker arms 25 and 26 respectively by means of rubber cushions 71. The cushions 71 are seated in sockets 25a, 25b and 26a, 26b respectively and are provided with apertures 71a aligned with corresponding apertures 25c as shown in Figure 4. The rods 23 and 24 are provided with threaded ends upon which tension adjusting nuts 23a and 24a are provided. By tightening the nuts 23a and 24a, tension may be placed on the resilient cushion 71 to thereby take up the slack in the reciprocating actuator mechanism.

The cushions 71 located in the recesses 25b and 26b respectively similarly control the resiliency in the connection between the J bolts 27, 28 and their respective rocker arms 25 and 26. The J bolts 27 and 28 are provided with adjusting nuts 27a and 28a respectively and as described above relative to the adjustment provided for the rods 23 and 24, the J bolts 27 and 28 may be drawn taut by means of the adjusting nuts 27a and 28a. As will be readily apparent, any looseness in the entire linkage may be taken up by means of the adjusting screws 23a, 24a, 27a and 28a and, alternatively should it become necessary to change any of the segments in the agitator 22 such a change becomes very simple through the mere expedient of loosening one or both of the adjusting nuts 27a, 28a to permit the removal of the J bolt 27 and/or 28 from the slots 64k in the end segments 63. It is apparent, that upon the release of tension on the agitator 22, that all of the segments may readily be removed.

Adjustment of the reciprocating drive system is accomplished through the provision of a plurality of pivots for the rocker arms 25 and 26. Thus, the rocker arms are provided with three vertically spaced apertures each, namely apertures 75, 76, 77, 78, 79 and 80 into which the pins 30 and 31 may be fit for fulcrum purposes. As may be seen from Figure 2, the sides 58 and 59 of the hopper 10 are provided with projecting yokes 32 and 33 forming guides for the rocker arms 25 and 26 respectively. The yokes are provided with horizontal slots having a vertical width equal to the diameter of the pins 31, and the holes 75, 76, 77, 78, 79 and 80, as may be seen from the dotted lines in Figure 4. The use of horizontal slots in the yokes 32 and 33 permits the simple change of the fulcrum pins 30 and 31 in the field without any tools as will now be described.

In view of the fact that the entire actuating mechanism, as shown in Figure 9, is under tension, it will be apparent that the fulcrum pins 30 and 31 are constantly urged inwardly against the sides 58 and 59 of the hopper. Thus, the fulcrum pins are constantly urged against the edge of the slots in the yokes 32 and 33 facing the sides 58 and 59 respectively. When it is desired to change the fulcrum position, and thus change the stroke of the agitator, an additional pin similar to pins 30 and 31 is inserted in the holes 75 or 77 or 78 or 80, depending upon the angular position of the rocker arms, and whether it is desired to shorten or lengthen the stroke.

For example, should the apparatus be initially positioned in such a way that the agitator is in the left hand position as viewed in Figure 9, the aperture 75 in the rocker arm 25 will be readily visible in its accompanying slot in the yoke 32, while the aperture 77 will be partially covered by the yoke. Likewise, the aperture 80 will be readily viewed in its corresponding slot while the aperture 78 will be covered. If it is desired to lengthen the agitator stroke, a spare pin similar to pins 30 and 31 will be positioned in the aperture 80 which may readily be accomplished since the aperture 80 is in clear view in its respective slot in yoke 33. The power take off shaft 16 is then turned a few degrees, from the tractor, until the aperture 77 comes into view in its corresponding slot in the yoke 32. The pin 31 can then readily be removed from its slot in the yoke 32 and inserted in the slot corresponding to the aperture 77. The pin 30 is then withdrawn and retained until the next change of stroke is desired.

In changing stroke it will of course be clear that positioning of the pins 30 and 31 in the apertures 77 and 80 will provide a maximum stroke of the agitator 22 while positioning of the pins in the apertures 75 and 78 will provide a minimum stroke. As was described above relative to the discussion of the agitator, the minimum stroke has been designed to be approximately ⅜ of an inch while the maximum stroke has been designed to be approximately 1⅜ inches. While these stroke lengths may of course be varied somewhat, it has been found that the specific strokes set out have been extremely satisfactory in operation for the different purposes described above.

*Orifice control.*—The orifices 35 in the hopper bottom 38 are, as has been described above, controlled through pivotal action of levers 36. Pivotal movement of the levers 36 from the furthest right hand position, shown in Figure 5 to the furthest left hand position Figure 6 will fully close the orifice from its full open position. Preferably, the opening-to-closing operation will consume approximately an angle of 90° operation of the lever 36 or, 45° deflection from neutral to either fully open or fully closed position. Although different angles may of course be used, it is preferred that approximately 45° deflection from neutral to either full open or closed position be provided since such deflection permits the use of a conveniently sized quadrant 41.

While we are of course aware that numerous prior art apparatuses for distributing material over the ground have utilized apertures with swinging orifice adjusting plates, the present invention contemplates the novel arrangement in which the final, fine opening control is positioned on the lever 36 rather than in the hopper bottom 38. Thus, while prior art orifices have generally been tear drop shaped as shown at the dotted lines 81 in Figure 5 with a corresponding smooth faced lever 36, the present invention contemplates the provision of a substantially round orifice 35 with a notch 82 in the face of the lever 36. When the orifice is almost completely closed, the notch 82 provides an extremely accurate control of the fine aperture size.

It has been found that the provision of the notch in the lever 36 rather than in the edge of the orifice 35, has greatly improved the accuracy of feeding, especially after the apparatus has been in use a substantial period of time. This is true since it has been found that the self-cleaning action of the teeth 65c of the agitator segments may, as a result of violent vibration, ultimately wear into the hopper bottom 38. This wear would affect, somewhat, the operation of the orifice, where the notch is positioned in the hopper bottom. However, it has been found that no wear whatever can effect the operation of the notch 82 when positioned on the levers 36 and, further, wear at the aperture 35 will not affect the accuracy of operation when the notch is positioned at 82 on the lever 36.

In most fertilizer spreading situations it is of course desired that the rod 39 be secured to each of the individual levers 36. However, it will be apparent that in the case of seeding, when it is desired that seeds be spaced in rows approximately 18 inches or further, apart, it is desirable that some of the apertures remain closed. This is readily accomplished through removal of the necessary pivot pin connections between certain of the levers 36 and the bar 39 so that movement of the bar, controlled by the lever 42 will open and close only certain selected apertures 35.

A consideration of Figures 5 and 6 will show that each of the levers 36 is provided with a heel 83 positioned at a point on the opposite side of the respective lever pivot pin 37 from the orifice 35. This heel is provided to control the tendency of the lever 36 to separate from the bottom plate under extremely heavy loads of fertilizer of similar material upon the lever 36. By providing the heel, any pivotal movement of the lever 36 away from the bottom plate at the apertures 35, will be required to occur about the edge 83a of the heel, which is remotely positioned from the pivot 37. Such pivotal action obviously requires a much greater effort against the lever 36 before separation of the lever 36 from the bottom 38 than would be required if no such heel were present. It will be noted that the springs 45 surrounding the pivots 37 and urging the levers 36 against the bottom plate 38, are preferably quite heavy and require approximately 200 pounds per ⅛ inch deflection. The springs are precompressed approximately 3/16 inch during installation and, as has been described above, this precompression prevents tilting of the lever 36 away from the apertures and at the same time provides a frictional resistance to movement of the levers 36 thereby eliminating the need for a separate detent arrangement at the quadrant 41.

From the above detailed description, it will appear that we have provided, an extremely efficient apparatus for the distribution of material. By providing a reciprocating agitator having a plurality of rows of upwardly facing teeth, in combination with longitudinally spaced guides extending transversely of the agitator, an extremely efficient comminuting action is provided when the agitator is confronted with hard, bulky material. Further by providing downwardly facing teeth, in combination with diagonally facing surfaces on the agitator wings, material comminuted by the upwardly facing teeth is distributed to the apertures in the hopper bottom and the apertures are simultaneously maintained in a clean, unclogged condition. Further, through the use of a tensioning type drive apparatus, extremely simple replacement of the agitator links is possible, and further a resilient drive is provided whereby shocks incurred during comminuting action and as a result of the eccentric drive utilized are minimized. Further, due to the positioning of the teeth supporting wings away from the hopper bottom, and through the use of only very small hopper bottom contacting support areas, metal-to-metal contact between the agitator and the hopper bottom is substantially eliminated and instead, the caking tendencies of fertilizers are utilized for controlled lubrication for preventing injuries to the hopper bottom during operation of the distributor.

Further, through the novel orifice control arrangement, the agitator can under no circumstances cause injury or vary the accuracy of the orifice defining levers 36. Also, in view of the vertical hopper wall 57, no bridging action in the fertilizer can occur, and as a result, it has been found that the distributor operates extremely evenly and under no circumstances runs dry with a load of fertilizer bridged above the agitator but out of contact therewith. Further, in view of the use of the power take off system for the eccentric drive 15 the distribution of the present invention can not completely miss whole areas when the ground is slick, as so often occurs with conventional fertilizer spreaders in which the agitator is driven from the wheels. Therefore, whether the wheels rotate or not, no effect whatever is had on the operation of the agitator. Of course, in view of the fact that no drive is to be taken from the wheels, there is substantially no tendency for the wheels not to rotate in the present distributing apparatus and, hence, it is extremely easy to drive the apparatus of the present invention.

Cleaning of the distributor of the present apparatus is also greatly facilitated through the elimination of drive for the agitator from the wheels. This is true since the agitator may be operated while the distributor is actually not moving along the ground. Thus, it is possible to operate the agitator upon completion of fertilizer spreading activity simultaneously with the introduction of water, through a hose or similar device, into the hopper. By agitating the agitator simultaneously with washing action, all of the fertilizer is very readily removed from the agitator and the inner walls of the hopper in a convenient manner.

It will be apparent to those skilled in the art, that modifications and variations may be made in the apparatus herein shown and disclosed in the preferred form, and it is therefore our intention not to be limited other than as required by the appended claims.

We claim as our invention:

1. Apparatus for distributing matter from a hopper bottom onto a surface therebelow comprising, a hopper bottom with at least one aperture therein, means adjustably regulating the dimensions of said aperture, an agitator reciprocably mounted over said aperture for moving said matter therethrough onto said surface, resilient linkage means secured to said agitator at its opposite ends and maintaining said agitator in tension, and actuating means connected to said linkage to reciprocate said agitator, said agitator comprising a series of segments pivotally secured to one another each having a plurality of rows of upwardly facing saw teeth and a short row of downwardly facing saw teeth said last named teeth being positioned immediately over said aperture.

2. Apparatus for distributing matter from a hopper bottom onto a surface therebelow comprising, a hopper bottom having at least one aperture therein, means adjustably regulating the dimensions of said aperture, an agitator reciprocably mounted over said aperture for moving said matter therethrough onto said surface, resilient linkage means secured to said agitator at its opposite ends and maintaining said agitator in tension, and actuating means connected to said linkage to reciprocate said agitator positively in both directions, said agitator comprising a series of segments pivotally secured to one another and having a plurality of rows of upwardly facing saw teeth and a short row of downwardly facing saw teeth said last named teeth being positioned immediately over said aperture, and wings secured to each of said segments adjacent the downwardly facing saw teeth and carrying a portion of said upwardly facing saw teeth, said wings having angularly extending side surfaces thereon for urging material moving downwardly past said wings into immediate juxtaposition with said aperture.

3. Apparatus for evenly distributing matter from a hopper onto a surface therebelow, comprising, a bottom in said hopper with a plurality of apertures therein, means simultaneously adjustably regulating the dimensions of said apertures, an agitator reciprocably mounted over said apertures for moving said matter therethrough onto said surface, linkage means resiliently secured to said agitator at its opposite ends and maintaining said agitator in tension, and eccentric actuating means connected to said linkage to reciprocate said agitator upon rotation of said eccentric means, said agitator having a plurality of rows of upwardly facing vertical saw teeth and having means thereon for supporting said agitator on the bottom of said hopper, said support means comprising widely spaced small area projections.

4. Apparatus for evenly distributing matter from a hopper onto a surface therebelow, comprising, a bottom in said hopper with a plurality of apertures therein, means simultaneously adjustably regulating the dimensions of said apertures, an agitator reciprocably mounted over said apertures for moving said matter therethrough onto said surface, linkage means resiliently secured to said agitator at its opposite ends and maintaining said agitator in tension, and eccentric actuating means connected to said linkage to reciprocate said agitator upon rotation of said eccentric means, said agitator having a plurality of rows of upwardly facing vertical saw teeth and having means thereon for supporting said agitator on the bottom of said hopper, said support means comprising widely spaced small area projections, and means on said reciprocating agitator for cleaning said apertures, said cleaning means comprising a plurality of downwardly facing teeth positioned centrally of said agitator immediately over said aperture.

5. Apparatus for distributing fertilizer or the like from a hopper onto a surface therebelow comprising, a bottom in said hopper with a plurality of apertures therein, means simultaneously regulating the dimensions of at least a portion of said apertures, an agitator reciprocably mounted over said apertures for moving said matter therethrough onto said surface, linkage means resiliently secured to said agitator at its opposite ends and maintaining said aperture in tension, and actuating means connected to said linkage to reciprocate said agitator from a source of power, said agitator comprising a plurality of pivotally inter-connected links, each of said links comprising a plurality of rows of upstanding vertical serrations and at least one row of downwardly facing serrations over each aperture.

6. Apparatus for distributing fertilizer or the like from a hopper onto a surface therebelow comprising, a bottom in said hopper with a plurality of apertures therein, means simultaneously regulating at least a portion of the dimensions of said apertures, an agitator reciprocably mounted over said apertures for moving said matter therethrough onto said surface, linkage means resiliently secured to said agitator at its opposite ends and maintaining said agitator in tension, actuating means connected to said linkage to reciprocate said agitator, and guide means for said agitator and extending transversely thereof whereby fertilizer positioned over said agitator will be restrained from reciprocating with said agitator and said agitator will be maintained in position over said apertures.

7. Apparatus for distributing fertilizer or the like from a hopper onto a surface therebelow comprising a bottom in said hopper with a plurality of apertures therein, means simultaneously regulating at least a portion of the dimensions of said apertures, an agitator reciprocably mounted over said apertures for moving said matter therethrough onto said surface, linkage means resiliently secured to said agitator at its opposite ends and maintaining said agitator in tension, actuating means connected to said linkage to reciprocate said agitator, and guide means for said agitator and extending transversely thereof whereby fertilizer positioned over said agitator will be restrained from reciprocating with said agitator and said agitator will be maintained in position over said apertures, said agitator comprising a plurality of pivotally connected links each having a plurality of rows of vertically facing serrations thereon and at least one row of downwardly facing serrations thereon positioned immediately over each of said apertures.

8. Apparatus for distributing fertilizer or the like from a hopper onto a surface therebelow comprising, a bottom in said hopper with a plurality of apertures therein, means simultaneously regulating at least a portion of the dimensions of said apertures, an agitator reciprocably mounted over said apertures for moving said matter therethrough onto said surface, linkage means resiliently secured to said agitator at its opposite ends and maintaining said agitator in tension, actuating means connected to said linkage to reciprocate said agitator, and guide means for said agitator and extending transversely thereof whereby fertilizer positioned over said agitator will be restrained from reciprocating with said agitator and said agitator will be maintained in position over said apertures, and said hopper having one of the walls thereof extending parallel to said agitator in the form of a substantially vertical wall whereby bridging of said fertilizer over said agitator is prevented.

9. Apparatus for distributing fertilizer or the like from a hopper onto a surface therebelow comprising, a bottom in said hopper with a plurality of apertures therein, means simultaneously regulating at least a portion of the dimensions of said apertures, an agitator reciprocably mounted over said apertures for moving said matter therethrough onto said surface, linkage means resiliently secured to said agitator at its opposite ends and maintaining said agitator in tension, actuating means connected to said linkage to reciprocate said agitator, and guide means for said agitator and extending transversely thereof whereby fertilizer positioned over said agitator will be restrained from reciprocating with said agitator and said agitator will be maintained in position over said apertures, and said hopper having one of the walls thereof extending parallel to said agitator in the form of a substantially vertical wall whereby bridging of said fertilizer over said agitator is prevented, and adjusting means for regulating the dimensions of said apertures comprising a lever pivotally mounted over each of said apertures and having a notch in the edge thereof controlling the size of said aperture whereby extremely fine adjustments of aperture opening may be provided.

10. An agitator drive for reciprocating an agitator in contact with hard, but frangible material, which comprises, tension means secured at opposite ends of said agitator, rocker arms pivotally mounted transversely of said agitator and resiliently connected to said agitator at said tension means, and second tension means securing the opposite ends of said rocker arms to an eccentric having its axis of rotation perpendicular to the axis of said agitator, the connections between said first and second tensioning means and said rocker arms comprising resilient material in compression.

11. An agitator for distributing fertilizer or the like downwardly from a supply positioned immediately in contact with said agitator from above, through a vertically facing aperture comprising, a plurality of pivotally connected segments, each of said segments having a plurality of longitudinal rows of upwardly facing serrations thereon, the middle of said rows standing upwardly to a greater extent than the outermost of said rows, and intermediate rows between said middle row and said outermost rows standing upwardly to a lesser extent than either of said middle or outermost rows, and means affixed to said segment and positioned immediately over said apertures for cleaning said apertures as said agitator reciprocates thereover.

12. An agitator for use in selectively comminuting or conveying material from a hopper through an aperture therebelow comprising, a plurality of pivotally connected segments mounted for reciprocable movement, each of said segments comprising a pair of sheet metal saw blades, each of said blades comprising a generally vertical portion having serrations along its upper edge and serrations along its lower edge at the mid point thereof and a laterally extending wing projecting laterally from said vertical portion and having vertically extending serrations at its extremity, said blade being clamped to its companion blade whereby the upper and lower edge serrations of the vertical section of each segment are of double width.

13. Apparatus for distributing fertilizer or the like from a hopper onto a surface therebelow comprising, a bottom in said hopper with a plurality of apertures therein, means simultaneously regulating at least a portion of the dimensions of said apertures, an agitator reciprocably mounted over said apertures for moving said matter therethrough onto said surface, linkage means resiliently secured to said agitator at its opposite ends and maintaining said agitator in tension, actuating means connected to said linkage to reciprocate said agitator, said agitator comprising a row of upstanding serrations, a second row of downwardly facing serrations and a plurality of rows of intermittently spaced upwardly facing serrations extending generally parallel to said first row.

14. An agitator drive for reciprocating an agitator in contact with hard, but frangible material, which comprises, tension means secured at opposite ends of said agitator, rocker arms pivotally mounted transversely of said agitator and resiliently connected to said agitator at said tension means, and second tension means securing the opposite ends of said rocker arms to an eccentric having its axis of rotation perpendicular to the axis of said agitator, the connections between said first and second tensioning means and said rocker arms comprising resilient material in compression and said rocker arms having a plurality of selectively useable fulcrums whereby the stroke of said agitator may be varied.

15. An agitator drive for reciprocating an agitator in contact with hard, but frangible material, which comprises, tension means secured at opposite ends of said agitator, rocker arms pivotally mounted transversely of said agitator and resiliently connected to said agitator at said tension means, and second tension means securing the opposite ends of said rocker arms to an eccentric having its axis of rotation perpendicular to the axis of said agitator, the connections between said first and second tensioning means and said rocker arms comprising resilient material in compression and said rocker arms having adjustable pivots, comprising a support for each rocker arm, each said support having a plurality of horizontal slots, each of said rocker arms having a plurality of round apertures of a diameter substantially the vertical width of said slots and cooperating with a corresponding slot and a pin positioned in one of the cooperating slots and apertures associated with each rocker arm to provide a fixed pivot when said rocker arm is under driving load.

16. In an apparatus for distributing fertilizer or the like from a hopper bottom having an aperture therein onto a surface therebelow, means for controlling the size of said aperture, said means comprising a lever pivotally mounted about a pivot post positioned adjacent said aperture, said lever having an operating portion extending to a point remote from said aperture and an aperture-defining edge positioned to close off said aperture as said lever is pivoted, said edge having a generally V-shaped notch therein whereby a final fine adjustment is provided, a spur on said lever on the side of said pivot post opposite from said edge for contacting said bottom, and resilient means biasing said lever toward said bottom at said post between said edge and said spur.

References Cited in the file of this patent

UNITED STATES PATENTS

| | | |
|---|---|---|
| 10,595 | Cooper | Mar. 7, 1854 |
| 222,078 | Richardson | Nov. 25, 1879 |
| 1,276,646 | Greb | Aug. 20, 1918 |
| 2,554,074 | Tuttle | May 22, 1951 |
| 2,557,704 | Stevens | June 19, 1951 |
| 2,620,094 | Swenson | Dec. 2, 1952 |
| 2,678,145 | Juzwiak et al. | May 11, 1954 |